May 19, 1953

A. J. WAHL 2,639,045

AUTOMATIC WARE DEALING AND TRANSFERRING APPARATUS

Original Filed Oct. 23, 1946

INVENTOR
Albert J. Wahl.
BY
George J. Craminger
ATTORNEY

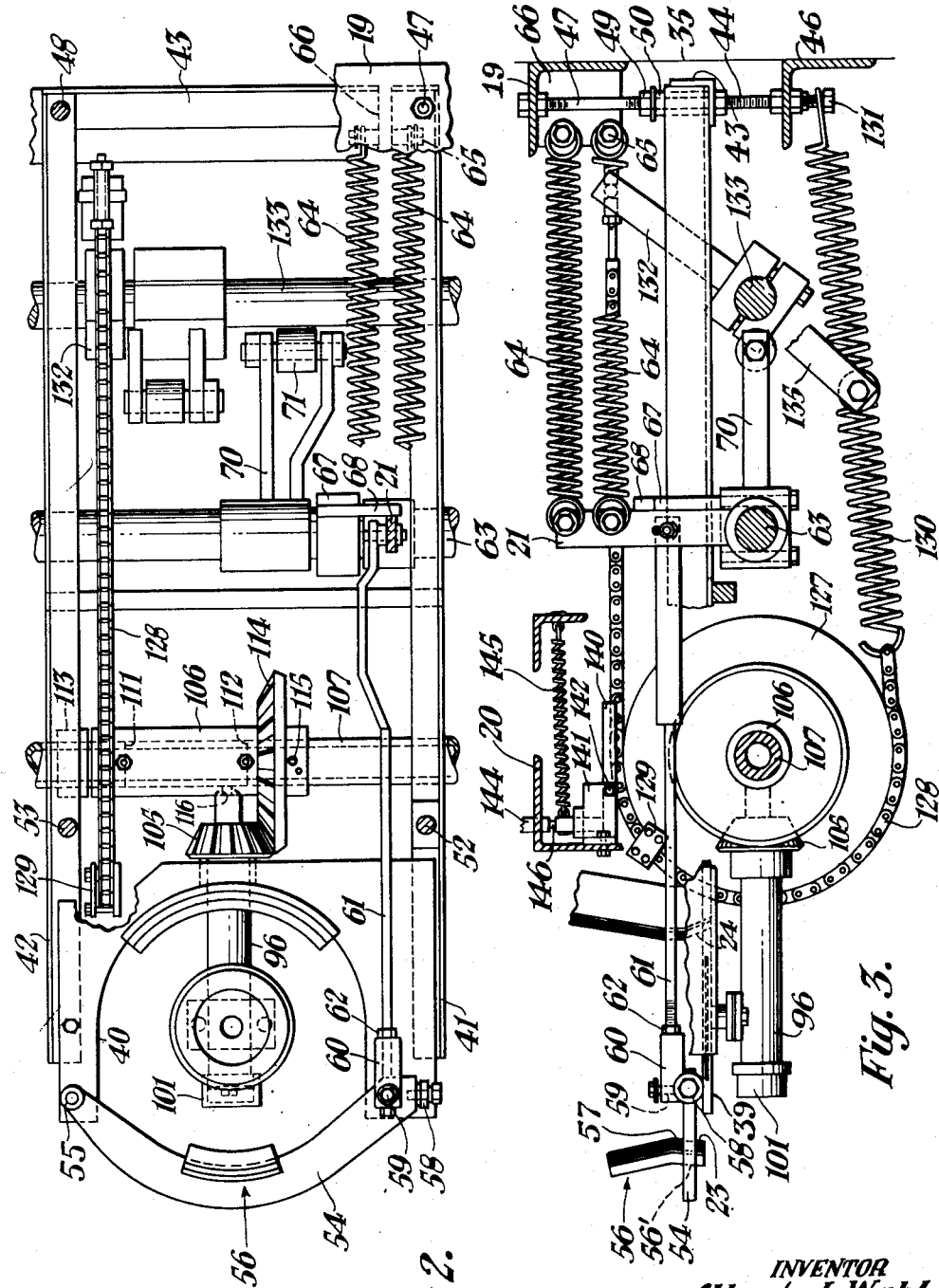

May 19, 1953 A. J. WAHL 2,639,045
AUTOMATIC WARE DEALING AND TRANSFERRING APPARATUS
Original Filed Oct. 23, 1946 3 Sheets-Sheet 3

INVENTOR
Albert J. Wahl.
BY
George J. Cominger
ATTORNEY

Patented May 19, 1953

2,639,045

UNITED STATES PATENT OFFICE 2,639,045

AUTOMATIC WARE DEALING AND TRANSFERRING APPARATUS

Albert J. Wahl, Brocton, N. Y., assignor to Miller Pottery Engineering Company, Swissvale, Pa., a corporation of Pennsylvania Original application October 23, 1946, Serial No. 705,143. Divided and this application July 20, 1948, Serial No. 39,639

9 Claims. (Cl. 214—8.5)

This invention relates to improvements in automatic ware dealing and transferring apparatus. This application is a division of my co-pending application S. N. 705,143, filed October 23, 1946, now Patent No. 2,545,369, issued March 13, 1951.

The present invention has to do with ware dealing and transferring apparatus for delivering ware, one piece at a time automatically to a decorating chuck. The ware is turned over in transit and placed on the chuck with the display surface up and in position to be operated upon by decorating implements.

One object of the present invention is to provide for apparatus which is simple in construction and reliable in operation. Another object is to provide for interrupting the operation of said apparatus without disconnecting the main drive and without imposing any undue strain on the apparatus. Another object is to provide an automatic dealer and transfer which can be rendered ineffective by rendering only one of the aforesaid assemblies inoperative. Another object is to provide for a novel form of drive for the transfer which can be quickly and easily released for drive adjustment purposes.

In accordance with this invention, the apparatus, generally, comprises a ware dealer for receiving a stack of inverted dishes and a co-operating ware transfer arranged to take ware from the bottom of the stack, a piece at a time, and transfer the ware to a chuck or ware receiver. The dealer is formed for gripping one or more of the lower pieces in a stack of ware to support the entire stack until the transfer comes into position therebelow whereupon the entire stack is lowered by gravity onto the transfer and some of the pieces above the lowermost piece regripped, the lowermost piece being in this manner released to the transfer. Said transfer chuck is supported for angular movement about an horizontal axis incident to movement between the point of pick up and deposit. An adjustable drive, including a flexible connection, is provided to move the transfer in one direction whilst being revolved automatically to turn the ware over in transit. A novel lock out is provided to render the transfer inoperative in ware receiving position thereby to render the entire assembly ineffective.

In the drawings:

Figure 2 is a top plan view of the dealer showing also the transfer device and some of the actuating mechanism for both.

Figure 3 is a side elevation of the structure shown in Figure 2 with a part of the dealer broken off.

Figure 4:
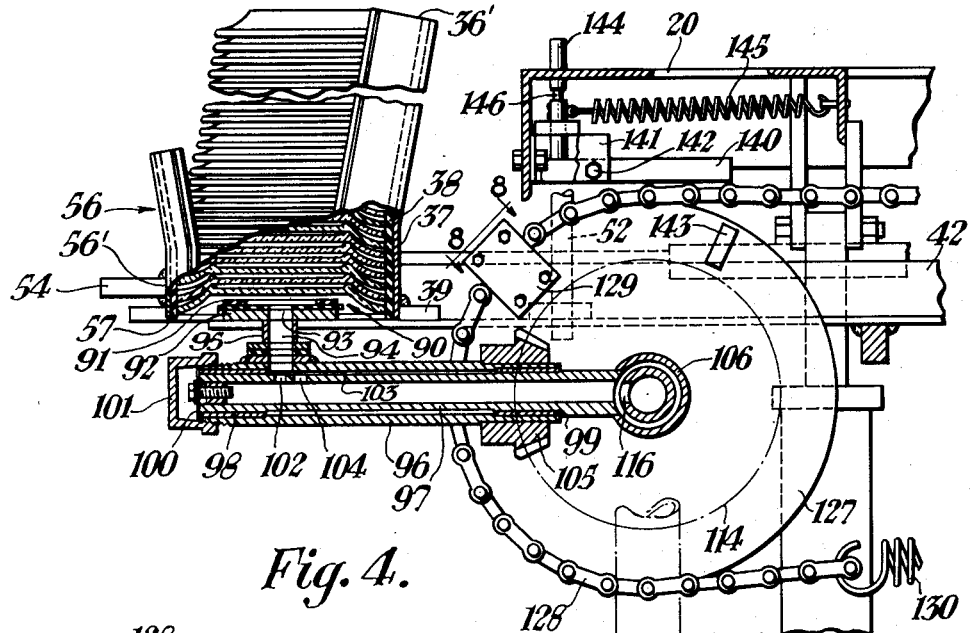
Figure 4 is an enlarged detail partly in section of the dealer and ware transfer.

The ware that is to be decorated is arranged in vertical stacks or bungs, Figure 4, several pieces high, in the dealer. The dealer is filled with ware by hand and since this represents the operator's principal duty, it can readily be understood why unskilled labor may be employed for the work.

It is desired to support a stack or bung of ware by means that may be automatically operated to release one piece of ware at a time from the bottom of a bung to a transfer device.

As explained in the parent application, a multiple station decorating machine may employ several dealer-transfers, one at each station and in such event, the assemblies hereof may be operated from a common drive. Due to the novel lock-out provisions associated with each dealer, any one of the dealers can be rendered inoperative without rendering the other dealer-transfers inoperative thereby to enable continued productive operation of the decorating machine at the other stations. This is extremely advantageous because otherwise the entire machine would necessarily be stopped and production interrupted at all stations.

Figures 5, 8:
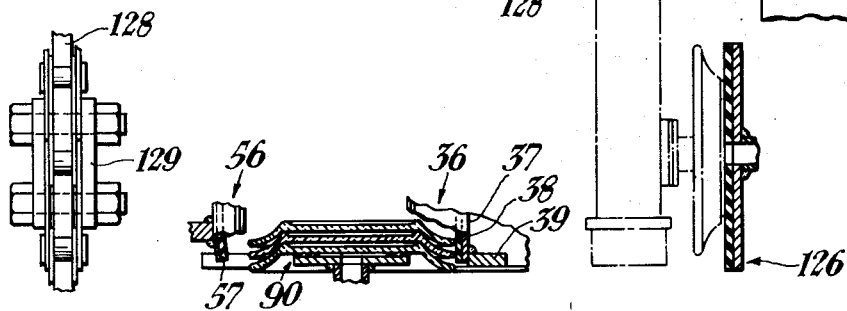
Figure 5 is a detail, partly in section, showing the dealer in open position.
Figure 8 is a detail in plan taken in the direction of arrows 8—8, Figure 4.
Figure 6:
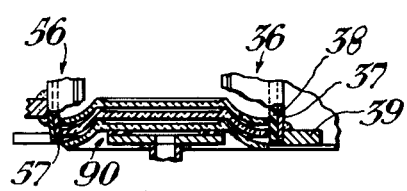
Figure 6 is a detail, partly in section, showing the dealer in closed position after a piece of ware has been released to the transfer device.
Figure 7:
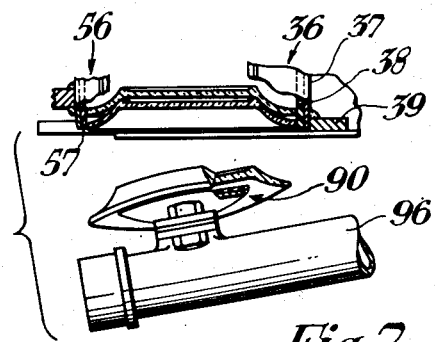
Figure 7 is a detail partly in section illustrating how the ware is turned as it is removed from the dealer by the transfer.

Said dealer comprises a member 36, Figures 5, 6, and 7, formed with a vertically extending, inclined ware support section 36', Figure 4, and a lower, vertically disposed gripping jaw section 37. Said member is preferably formed like a shallow trough with the concave side presented to the ware. This surface is lined with resilient material such as rubber indicated by the reference character 38.

Member 36 is supported by a plate 39 to which it is rigidly secured preferably by welding the lower end 37 thereto on the inside of a semi-circular recess 40, Figure 2, formed in the plate. Plate 39 is bolted to and supported by a pair of spaced, parallel angles 41 and 42 that are braced across the rear ends by a cross angle 43 thereby forming a rectangular frame that is supported on the machine frame for vertical adjustment in the following manner: Angle 43 rests upon a pair of vertically adjustable studs 44, Figures 1 and 3, threaded into a cross angle 46 Figure 3, of the machine frame and common to all the dealers, the studs being carried one at each rear corner of the rectangular frame, although only one of the pairs is seen in the drawings (Figure 3). Angle 43 is clamped against these studs by a pair of spaced studs 47 and 48 thereabove that are threaded downwardly through top, rear, cross angle 19 of machine frame 35. Studs 47 and 48 are provided with sleeves 50 which bear against angle 43 and are secured by nuts 49 to hold the rear end of the frame against displacement at the adjusted level. Adjustable hanger bolts 52 and 53 support the front end of the dealer frame from a front, top, cross angle 20, of the machine frame, common to all the dealers, Figures 3 and 4. Thus the dealer frame may be adjusted upwardly or downwardly to the desired elevation and leveled.

In order to grip the lowermost piece of a bung of ware as aforesaid, a curved lever 54, Figures 2, 3 and 4, is pivoted on a pin 55 carried by plate 39 and located near the open end of the recess. At the center of the lever and on the inside curve is secured another guide and jaw member 56 which is similar to member 36 except that it is smaller in width and height. The upper section of this member is inclined relative to the jaw section 56' which is welded or otherwise secured to lever 54 in a position diametrically opposite the jaw section of member 36 when the jaws are closed. Member 56 is also formed like a shallow trough and has substantially the same radius of curvature, at least in the jaw zone, as the other member. This radius of curvature preferably conforms to the curvature of the ware. In order to compensate for fractional differences in diameter of the ware, and to avoid damage thereto, the jaw portion 56', Figure 3, is also lined with resilient material 57 which may extend over the entire trough-like surface of the member is desired.

At the free end of lever 54 is a roller 58 rotatably mounted upon a horizontal stud screwed into the end of the lever. Said roller is adapted to rest upon and roll on plate 39 and to support the free end of the lever.

Means for automatically moving lever 54 to cause the jaws to grip the ware, as depicted in Figure 6, and to release the ware, as illustrated in Figure 5, comprises a vertical pin 59, Figures 2 and 3, rigidly secured in a hole near the outer end of lever 54. To this pin is pivotally attached a connector 60 into which a pull rod 61 is adjustably screwed and held in position by a nut 62. The clearance between the jaws may be conveniently adjusted by removing connector 60 from pin 59 and screwing it in one direction or the other on pull rod 61.

Figure 1:
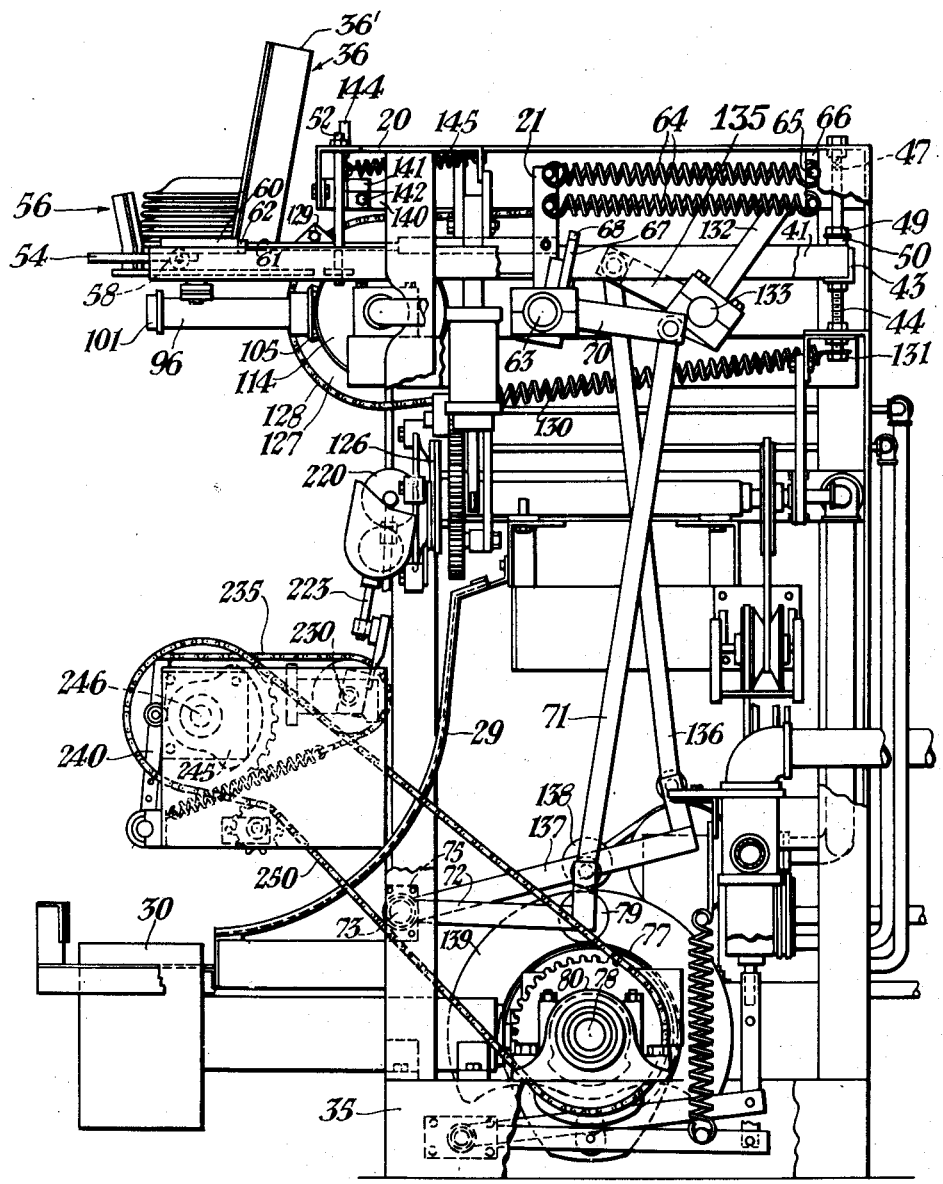
Figure 1 is a right end elevation of a decorating machine with the automatic ware dealing and transferring apparatus installed thereon.

Pull rod 61 is pivotally attached at the other end to a vertical lever 21 mounted on a frame supported cross shaft 63, Figures 1, 2 and 3. In a multiple station decorating machine, this shaft is common to all of the dealers. Said lever 21 is freely rotatable on shaft 63 and gripping pressure is applied on the ware by plural coil springs 64 attached to the upper end of lever 21 and anchored at the opposite end to bolts 65 secured in a bracket 66 rigidly fixed to machine frame 35.

To relax the pressure of the gripping jaws upon the ware, lever 21 is rotated in a counter-clockwise direction, Figure 1, against the tension of the coil springs by a lever 67 clamped to shaft 63 and rotatable therewith. Each lever 67 has a horizontal projection 68 adapted to engage lever 21 and turn it in the same direction as shaft 63 when shaft 63 is turned in a counter-clockwise direction as viewed in Figure 1. Shaft 63 is common to all of the dealers. This action opens all of the jaws of the several dealers and permits each bung of ware to drop down, Figure 5, then upon reverse, or clockwise, rotation of shaft 63, Figures 3 and 4, springs 64 associated with each dealer, close the gripping jaws with which they are associated and to make certain that adequate retaining pressure is applied to the ware, each lever 67 is adjusted so as to turn clockwise sufficiently to disengage associated lever 21.

Shaft 63 is rotated by a lever 70 which is clamped thereto. Said lever is pivotally connected to a push rod 71, Figure 2, and connected to a bifurcated lever 72 having a bearing sleeved on shaft 73 supported by bearings 75 mounted on the machine frame. Lever 72 is raised by means of cam 77, Figure 1, fixed on the cam shaft 78 of the decorating machine which engages a cam roller 79 rotatably supported between the bifurcated part of the lever. The working surface of this cam is developed so as to provide for the opening and closing of the gripping jaws in the manner previously described.

Cam shaft 78, Figure 1, is supported in bearings such as that at 80 on the machine frame 35 and is operated by the main drive motor and manually adjustable speed transmission (not shown) of the decorating machine. Thus the speed of rotation of cam shaft 78 may be varied manually which means that the rate of discharge of ware from a dealer may be increased or decreased in accordance with the requirements of production.

Ware is carried from the dealer and to its associated decorating station by the co-acting transfer device previously mentioned.

With reference particularly to Figure 4, 90 is a vacuum chuck formed with a rubber sealing ring 91 demountably secured to a circular plate 92 having a central aperture 93 therein communicating with a vacuum passage 94 in the pedestal 95 which is welded to a hollow, tubular sleeve 96 forming part of a transfer arm. Said sleeve is rotatably telescoped upon a hollow tubular pipe 97 and sealed against leakage thereagainst by bushings 98 and 99, bushing 98 being held against axial displacement by a circular plate 100 bolted over the open end of pipe 97 and bushing 99 being seated against a shoulder formed on the pipe. A cap 101 screwed onto the end of sleeve 96 also acts as a vacuum seal. Vacuum passage 94 communicates with the hollow interior of pipe 97 through a hole 102 bored through the shaft. Communication is also established through the clearance space 103 between the sleeve and pipe and another hole 104 in pipe 97 adjacent hole 102. 105 is a pinion gear fixed on sleeve 96.

Each pipe 97 is welded to an associated hollow sleeve 106, see Figure 2, that is telescoped upon a stationary vacuum pipe 107, in which vacuum is intermittently established by means (not shown) associated with the decorating machine of the parent application and mounted upon the machine frame. Said sleeve is larger in diameter than the pipe so as to allow ample clearance for the insertion of sleeve bearings 111 and 112, Figure 2, in opposite ends thereof which seal the ends of the sleeve and upon which the sleeve turns about the axis of pipe 107. Axial displacement in one direction is prevented by a set collar 113 and in the other by a gear 114, which meshes with pinion 105, and is fixed on the shaft by set screws 115. Pipe 107 has a hole 116 therein by means of which communication is established between pipes 97 and 107.

Thus, to deliver a piece of ware from a bung to a decorating chuck 126, the vacuum chuck 90 is turned about the axis of pipe 107 for approximately 90°, see Figure 4, by apparatus to be presently described. Incident to this movement, the chuck is also caused to rotate, Figure 7, about the axis of pipe 96 for approximately 120° as a result of the pinion 105, Figures 2, 3, and 4, being turned by the stationary gear 114. Thus, as illustrated in Figure 4, ware taken from the dealer in horizontal inverted position is carried to a lower level and in transit revolved so as to present the back or foot ring zone of the ware to the decorating chuck 126 in a vertical position.

The apparatus for moving the transfer chuck 90 from its associated dealer to an associated decorating chuck comprises a disc 127, Figures 3 and 4 over which a sprocket chain 128 is trained. The sprocket chain is securely fastened to the disc by a clamp 129, Figures 3 and 8, attached to the disc. The sprocket chain is connected at one end to a coil spring 130, Figures 1, 2, and 3, anchored to a stud 131 connected to the machine frame. The other end of the sprocket chain is attached to a lever 132 that is fixed on shaft 133, this shaft being common to all of the transfer devices and in the case of a multiple station decorating machine it will be understood that for actuating each transfer device, a lever 132 is clamped to rotatable shaft 133 at the proper position.

Shaft 133 is mounted for rotation in bearings supported by the machine frame. Said shaft is rotated by a crank 135, Figure 1, fixed on the shaft which is pivotally connected to a push rod 136 that in turn is pivotally connected to a lever 137 pivoted on the machine frame. Lever 137 is provided with a cam roller 138 that engages the periphery of cam 139 secured to cam shaft 78. The working surface of this cam is formed for moving the chuck carrying arm of the transfer device in the manner aforesaid.

Figure 9:
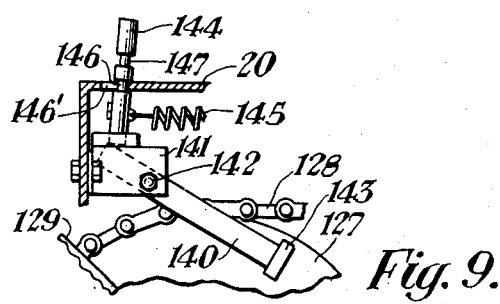
Figure 9 is a detail partly in section showing the transfer lock in transfer locking position.

The operation of the transfer device may be arrested without interrupting the operation of other transfer devices by a lockout device shown in Figures 3 and 4. This lockout device comprises a bar 140 pivotally attached to a bifurcated lug 141 secured to the inside of the vertical web of the top, front, cross angle 20 of the machine frame, see Figure 9. Stop bar 140 has an off-center pivot 142 so as to allow the long end of the bar to drop down by gravity into a position where it may engage lug 143, see Figure 4, welded on the side of disc 127 when vertically movable pin 144 is raised by hand. Said pin is slidable in oversize hole 146', Figure 9, in angle 20 and may be held in raised position by the combined action of spring 145 which pulls the pin off center and causes the lower groove 146 to move into interfitting relation with the angle around the rim of the hole. To lock the pin in lower position to thereby disengage the stop bar 140, from the lug 143, the pin is unlatched and depressed until the upper groove 147 locks in the hole as aforesaid.

In commercial practice, some of the ware will be crooked or over or undersize. To prevent crooked or undersize ware from prematurely falling from the dealer, I propose to grip some of the bung components in a resilient external embrace as would be provided by a pad of rubber, or the like, of sufficient thickness to allow for differences in the diameter of the ware. The ware transfer device, which in this structure includes a transfer arm with a ware support thereon, is adapted to position the ware support below and in close proximity to the lowermost piece of ware in the bung. When the gripping pressure on the bung components is relaxed, the entire bung drops down upon the ware support and when the gripping pressure is again applied, it may also be effective on the lowermost piece in the bung but at a lower value than on those pieces of ware thereabove. This may be accomplished by forming the troughs 56 and 35 with gripping jaw sections 23 and 24 respectively, as shown in Figure 3 that are divergent or outwardly tapering. Although the lowermost piece of ware, under this circumstance would not be fully released from the dealer, should the transfer fail to tightly grip the piece, say for instance, because of some crooked or warped condition of the ware or for some other reason, the piece will not fall from the dealer, but will remain in place until removed by hand. It further should be noted that when the gripping pressure on the bung is relaxed to permit the entire bung to drop down upon the ware support, and when the pressure again is applied, the piece of ware next to the lowermost piece is gripped by sections of the jaws that are not divergent or outwardly tapered. Consequently, as the transfer draws the lowermost piece away from the pile, the gripping jaws exert sufficient pressure on the remainder of the pile to prevent other pieces of ware from being pulled away or from dropping. Of course, the ware may, if desired, be released entirely from the gripping jaws by locating the lower end of the jaws above the position the piece would normally occupy when resting upon the ware support. Thus, the dealer may be formed for either wholly releasing the ware or retaining the piece with a light pressure requiring that the transfer device pull it from the dealer.

The decorating implement 220 is carried by a holder 223. Said holder is rotatably mounted on shaft 238 for movement into and out of decorating position by a pivoted lever 240 and pull chain 235 actuated by a cam 245 on shaft 246 rotated by sprocket chain 250 from main drive shaft 78 all as described in detail in the parent application. The implement holder 223 is moved back away from the decorating chuck to avoid interference with the transfer 96 when delivering ware to the decorating chuck and when returning to the loading position below the dealer magazine. The decorating chuck is vacuumized to grip the ware thereto when the same has been delivered by the transfer chuck, however at the termination of the decorating operation, the vacuum is interrupted and the decorated ware falls from the chuck down a chute or slide 29 to a belt 30 which carries the ware away.

I claim:

1. A ware dealer for supporting a bung of dinnerware and releasing the ware one piece at a time, comprising a frame, a stationary gripper mounted on the frame, a movable gripper hinged to the frame, a pull rod connected to the free end of said hinged gripper, a lever connected to the rod, resilient means connected to said lever, cam mechanism movable into and out of engagement with the lever for opening the gripper and effecting a release of a piece of ware, and a roller riding on said frame and carried by the free end of said movable gripper, said resilient means operating to apply gripping pressure to the bung of dinnerware after said piece is released.

2. A ware dealer for supporting a bung of dinnerware and releasing the ware one piece at a time, comprising a frame, a stationary gripper mounted on the frame, a movable gripper hinged to the frame, a roller riding on said frame and carried by the free end of said movable gripper, and means connected to said hinged gripper for swinging it toward and away from the stationary gripper whereby pieces of ware are released.

3. A dealer for supporting a bung of dinnerware operable to release a piece of ware at a time from the bottom of the bung comprising, a pair of grippers arranged to grip between them some of the lower components of the bung and means for moving one of the grippers relative to the other to apply and relax a gripping pressure on the bung, the bottom sections of said grippers being outwardly flared a sufficient amount to exert less pressure on the lowermost piece of ware than is exerted by the grippers on the pieces of ware above said lowermost piece.

4. A dealer for supporting a bung of dinnerware and releasing pieces of ware one at a time from the bottom of the bung comprising a frame, a pair of grippers mounted on said frame, means for moving one of the grippers relative to the other for applying and relaxing gripping pressure on some of the bung components, and an inclined stationary member for holding the bung upright, the bottom sections of said grippers being outwardly flared a sufficient amount to exert less pressure on the lowermost piece of ware than is exerted by the grippers on the pieces of ware above said lowermost piece.

5. A dealer for supporting a bung of dinnerware and releasing a piece of ware at a time from the bottom of the bung comprising a frame, a pair of grippers mounted on said frame, one of said grippers being stationary and the other being hinged and movable relative to the other and means for moving said hinged member to apply and release gripping pressure to the bung, the bottom sections of said grippers being outwardly flared a sufficient amount to exert less pressure on the lowermost piece of ware than is exerted by the grippers on the pieces of ware above said lowermost piece.

6. A dealer for supporting a bung of dinnerware and releasing the ware one piece at a time from the bottom of the bung comprising, a frame, a stationary gripper mounted upon said frame, a movable gripper mounted upon said frame, a pull rod for actuating said movable gripper, and resilient means for applying gripping pressure to the bung, the bottom sections of said grippers being outwardly flared a sufficient amount to exert less pressure on the lowermost piece of ware than is exerted by the grippers on the pieces of ware above said lowermost piece.

7. A dealer for supporting a bung of dinnerware and releasing the ware one piece at a time from the bottom of the bung comprising, a frame, a stationary gripper mounted upon the frame, a pivotally mounted gripper mounted upon said frame, cam actuated means for moving said pivotally mounted gripper and an inclined member for holding the bung upright, the bottom sections of said grippers being outwardly flared a sufficient amount to exert less pressure on the lowermost piece of ware than is exerted by the grippers on the pieces of ware above said lowermost piece.

8. A ware dealer for supporting a bung of dinnerware and releasing the ware one piece at a time, comprising a frame, a stationary gripper mounted on the frame, a movable gripper hinged to the frame, a pull rod connected to the free end of said hinged gripper, a lever connected to the rod, resilient means connected to said lever, cam mechanism movable into and out of engagement with the lever for opening the gripper and effecting a release of a piece of ware, and a roller riding on said frame and carried by the free end of said movable gripper, said resilient means operating to apply gripping pressure to the bung of dinnerware after said piece is released, the bottom sections of said grippers being outwardly flared a sufficient amount to exert less pressure on the lowermost piece of ware than is exerted by the grippers on the pieces of ware above said lowermost piece.

9. A ware dealer for supporting a bung of dinnerware and releasing the ware one piece at a time, comprising a frame, a stationary gripper mounted on the frame, a movable gripper hinged to the frame, a roller riding on said frame and carried by the free end of said movable gripper, and means connected to said hinged gripper for swinging it toward and away from the stationary gripper whereby pieces of ware are released, the bottom sections of said grippers being outwardly flared a sufficient amount to exert less pressure on the lowermost piece of ware than is exerted by the grippers on the pieces of ware above said lowermost piece.

ALBERT J. WAHL.

References Cited in the file of this patent

UNITED STATES PATENTS

| Number | Name | Date |
|---|---|---|
| 630,187 | Cunningham | Aug. 1, 1899 |
| 972,649 | Rose | Oct. 11, 1910 |
| 1,688,510 | Taylor | Oct. 23, 1928 |
| 1,947,609 | McNamara | Feb. 20, 1934 |
| 2,059,546 | Brandenburg | Nov. 3, 1936 |
| 2,297,847 | Wilckens | Oct. 6, 1942 |
| 2,382,405 | Eckman | Aug. 14, 1945 |
| 2,413,446 | Glassner | Dec. 31, 1946 |